July 12, 1960 — S. D. WILTSE — 2,944,840
TUBE COUPLING HAVING A REINFORCED SEALING AND LOCKING RING
Filed Feb. 4, 1960
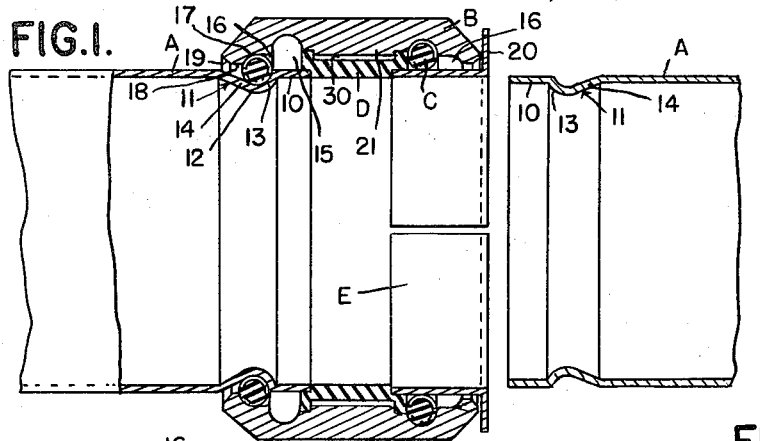
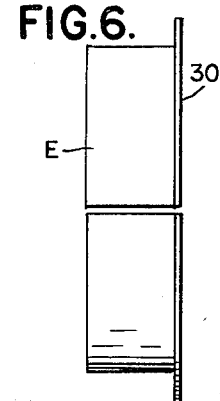
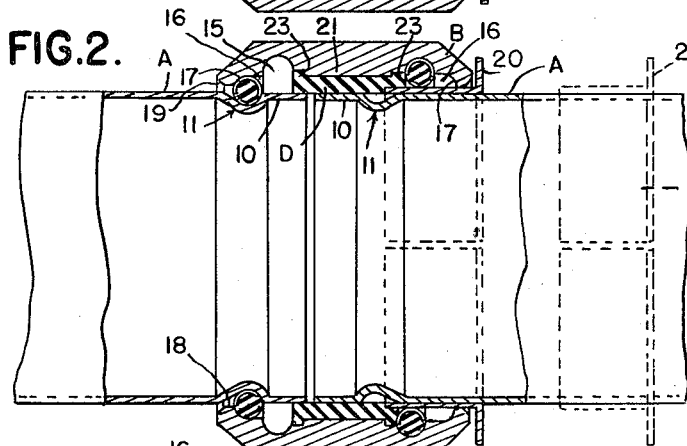
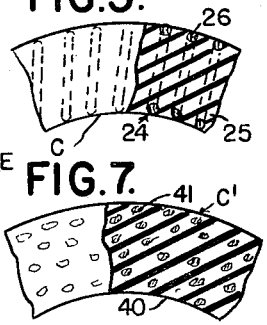
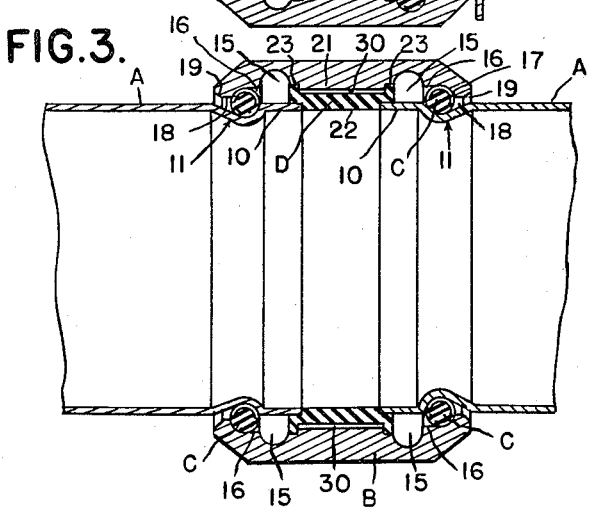
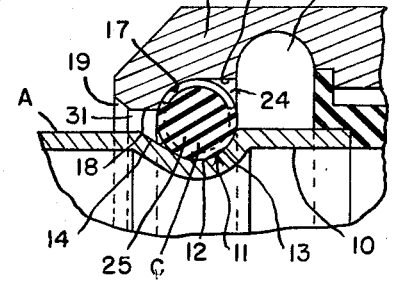
INVENTOR.
SUMNER D. WILTSE
BY
Whittemore, Hulbert & Belknap
ATTORNEYS United States Patent Office
2,944,840
Patented July 12, 1960

2,944,840

TUBE COUPLING HAVING A REINFORCED SEALING AND LOCKING RING

Sumner D. Wiltse, 4943 Ridgewood Ave., Detroit, Mich.

Filed Feb. 4, 1960, Ser. No. 6,697

8 Claims. (Cl. 285—232)

This invention relates generally to a tube coupling having a reinforced sealing and locking ring, and constitutes a continuation-in-part of the subject matter of my application filed September 16, 1957, bearing Serial No. 684,113, now abandoned.

One of the essential objects of the invention is to provide a tube coupling of the type mentioned wherein a tubular fitting of improved configuration is adapted to receive an end of a length of tubing or pipe, and wherein a composite elastic ring is adapted to be interposed between preformed or shaped annular grooves or recesses respectively in said fitting and in said length of tubing or pipe and is operable (1) to form a fluid-tight seal that will effectively prevent leakage between said fitting and said length of tubing or pipe, (2) to hold the length of tubing or pipe against outward end-thrust and thereby prevent such tubing from being accidentally withdrawn or pressure-blown endwise from said fitting, and (3) to permit universal or angular movement of the length of tubing or pipe relative to the fitting.

Another object is to provide a tube coupling that is simple in construction, economical to manufacture, easy to assemble and disassemble and efficient in operation.

Other objects, advantages and novel details of construction of this invention will be made more apparent as this description proceeds, especially when considered in connection with the accompanying drawing wherein:

Figure 1 is a fragmentary vertical sectional view through a partially assembled tube coupling embodying my invention, showing one length of tubing fully assembled with the fitting, and showing one split ring within the fitting about to receive the second length of tubing.

Figure 2 is a view similar to Figure 1, showing the second length of tubing aforesaid received within the split ring and advanced within the insert in the fitting, and showing by dotted lines the split ring after it has been withdrawn from the fitting.

Figure 3 is a vertical longitudinal sectional view through a fully assembled tube coupling embodying my invention, and showing portions of the tubing broken away.

Figure 4 is an enlarged fragmentary vertical sectional view through a portion of the tube coupling.

Figure 5 is an enlarged fragmentary view of the composite ring shown in Figures 1 to 4 inclusive, with parts broken away and in section.

Figure 6 is an elevational view of one of the split rings employed during assembly and disassembly of the tube coupling.

Figure 7 is a view similar to Figure 5, but showing a modified form of composite ring.

Figure 8 is a view similar to Figures 5 and 7, but showing another modified form of composite ring.

In the drawing, A are lengths of tubing or pipes, B is a tubular fitting receiving adjacent end portions of said lengths, and C are composite radially expansible and contractible elastic rings interposed between said fitting B and the adjacent end portions 10 of said lengths of tubing or pipes.

As shown, the adjacent end portions 10 of the lengths A of tubing or pipes are substantially straight and have at their periphery identical outwardly opening inwardly projecting preformed annular grooves or channels 11 adapted to receive the composite rings C. Each groove or channel 11 has a curved bottom 12, a curved side 13, and a substantially straight inclined side 14.

The fitting B is preferably a one-piece metal casting and is an elongated annulus of sufficient length to not only receive and form an enclosure for the adjacent end portions 10 of the lengths of tubing, including the grooves 11, but to permit the adjacent end portions 10 of the lengths of tubing or pipes to be spaced apart and to receive therebetween a compressible and deformable annular insert or spacer D of resilient material such as rubber or rubber-like material or rubber composition.

Preferably, the fitting B is provided at opposite ends of the insert D with identical inwardly opening outwardly projecting relatively deep preformed annular grooves or channels 15 adapted to initially receive the composite rings C while the parts are being assembled, and is provided at the outer sides of said channels 15 with identical inwardly opening outwardly projecting relatively shallow preformed annular grooves or recesses 16 that connect or open axially into the outer sides of the channels 15 and are adapted to receive the composite rings C when the parts are finally assembled.

The outer sides 17 of the annular recesses 16 are preferably curved, and such curved sides 17 are offset outwardly and spaced from the curved sides 13 of the grooves 11 to receive the composite rings C therebetween when the parts are finally assembled.

As shown, each curved or concave annular surface 13 of the grooves 11 in section form substantially an arc of a circle of an extent of slightly less than 90°. Likewise, each curved or concave annular surface 17 of the annular recesses 16 in section forms an arc of a circle of an extent of slightly less than 90°.

To facilitate the assembly and disassembly of the parts, the fitting B has at the outer sides of the annular recesses 16 annular entrance portions 18 having beveled or tapered outer ends 19. Each annular entrance portion 18 has a diameter slightly larger than the external diameter of the end portions 10 of the lengths A of tubing to not only permit the end portions 10 of such lengths to be inserted into the fitting B, but to also permit short lengths of longitudinally split rings or cooperating semi-circular members E to be inserted within the fitting B, whereby such members E may be used while the parts are being assembled or disassembled to temporarily retain the composite rings C in the channels 15 in the fitting B during insertion or withdrawal of the lengths A of tubing or pipes relative to said fitting, and whereby such split rings E may be sleeved upon and serve as guides for the lengths A of tubing or pipes when the end portions 10 thereof are inserted into or withdrawn from the fitting B. Preferably the split rings E are provided at their outer ends with laterally projecting annular flanges 20 that serve as finger pieces by which the split rings E may be conveniently manipulated. Thus these split rings E facilitate the insertion and withdrawal of the lengths A of tubing or pipes relative to the fitting B.

Normally when the parts are finally assembled, the body of the resilient insert D is spaced slightly from a centrally located inwardly projecting annular enlargement or pilot portion 21 of the fitting B, and has an inwardly projecting annular portion 22 fitting snugly between and forming seals with the adjacent end portions 10 of the lengths A of tubing or pipes. As shown, this insert D has at opposite ends thereof outwardly projecting annular attaching flanges 23 that straddle and engage opposite ends of the annular enlargement or pilot portion 21 of the fitting. Preferably the outer sides of the attaching flanges 23 are substantially flush with and form extensions or continuations of the inner sides of the channels 15 in the fitting, and the inner surface of the inwardly projecting annular portion 22 is substantially flush with and forms an extension or continuation of the inner surfaces of the lengths A of tubing or pipes.

Each composite ring C shown in Figures 1 to 5 inclusive comprises an outer hollow or tubular metallic cage 24 and an inner solid resilient core 25. Preferably the cage 24 is an annulus formed from a spiral or helical wire spring having convolutions 26 that are substantially circular in cross section. Such convolutions 26 are substantially uniform in diameter throughout the circumference of the cage and are embedded in the periphery of and serve as a retainer for the core 25. The core 25 is an annulus formed from a body of rubber or rubber-like material or rubber composition and is molded as a filler within and between the convolutions 26 of the wire spring forming the cage. Such resilient core is circular in cross section, and has a substantially uniform diameter throughout the circumference thereof.

The inside diameter of each composite ring C in its free state is slightly less than the outside diameter of each of the annular grooves 11 in the end portions 10 of the lengths A of tubing or pipes, so that the rings C will fit tightly in the grooves 11. However, such composite rings C are expansible and contractible radially and are capable of being stretched to encircle the split rings E when the latter are inserted into the fitting B while the parts are being assembled.

When it is desired to assemble the parts, the composite rings C are stretched radially onto the split rings E when the latter are inserted one at a time into the fitting B, and such rings are initially received in the channels 15 in said fitting, as illustrated in Figure 1 at the right-hand side thereof. The end portions 10 of the lengths of tubing are then inserted one at a time into the split rings E, and are advanced to a position within the insert or spacer D, as illustrated in Figure 2 at the right-hand side thereof. This advancement of the end portions 10 of the lengths of tubing causes the insert or spacer D to be distorted or stretched radially into the clearance space 30 against the pilot portion 21 of the fitting B. The split rings E are then withdrawn one at a time from the fitting B, as illustrated by dotted lines in Figure 2 at the right-hand side thereof. The lengths A of tubing or pipes are then withdrawn one at a time from the insert or spacer D. This will cause (1) the insert or spacer D to return to its original position wherein the body thereof is in radially spaced relation to the pilot portion 21 of the fitting, (2) the grooves 11 in the tubing to be positioned successively in registration with the channels 15 and the recesses 16 in the fitting B, and (3) the inner ends of the tubing A to abut and be held in snug or firm sealing engagement with the opposite ends of the inwardly projecting annular portion 22 of the insert or spacer D.

When the lengths A of tubing are withdrawn from the spacer D the grooves 11 in the tubing A register first with the channels 15 in the fitting B. The composite rings C will automatically constrict into and will snugly engage the bottoms 12 of the grooves 11 in the tubing. Such rings C then ride in the grooves 11 and are carried outwardly thereby until the latter are positioned next in registration with the recesses 16 in the fitting B. The rings C are then in firm or snug engagement with the curved portions 13 and 17 respectively of the tubing A and fitting B, as illustrated in Figure 3.

In use, the composite rings C in cooperation with the opposed curved portions 13 and 17 respectively of the tubing A and fitting B will form fluid-tight seals that will effectively prevent leakage between the fitting B and the lengths A of tubing or pipes. The cage 24 of each composite ring C will resist compression, and thus such rings C will also hold the lengths A of tubing or pipes against outward end-thrust, and thereby will prevent any accidental withdrawal of the lengths A of tubing or pipes endwise from the fitting B. In fact, if there is any outward end-thrust, then the seal affected becomes firmer and stronger. Such rings C, in cooperation with the grooves 11 and recesses 16, will also maintain the seals between the spacer D and lengths A of tubing. Also, the composite rings C serve as fulcrums for the lengths A of tubing, and the clearance or annular spaces 31 between the inclined sides 14 of the grooves 11 and the beveled end portions 19 of the fitting B will permit angular or universal movement of the lengths A of tubing relative to the fitting B about said fulcrums, and without any danger of leakage.

The lengths A of tubing are also relieved of any binding strains or stresses, especially in the event of any misalignment. Such connection also relieves the lengths of tubing from fatigue and possible breakage adjacent the fitting. Also, the composite rings C reduce noise transmission as they cushion and dampen vibration.

The insert or spacer D provides a continuous internal bore or inner surface between the lengths A of tubing, and thereby prevents any particles lodging between the tubing.

To disassemble the parts, the lengths A of tubing are initially pushed inwardly one at a time into the insert or spacer D. During this inward movement, the inclined portions 14 of the grooves 11 push or cam upwardly the composite rings C into the channels 15 in the fitting B. The split rings E are then sleeved one at a time onto and are pushed lengthwise of the tubing A into the fitting B. This causes the composite rings C to be held out of the way of the tubing A, so that such tubing can then be withdrawn from the split rings E in the fitting B. Thereafter the split rings E and composite rings C are withdrawn one at a time from the fitting B to complete the disassembly of the parts.

In Figure 7 I have shown a slightly modified form of composite ring C' wherein such ring comprises a solid resilient body 40 of circular cross section wherein metal particles 41 are embedded at random as reinforcements to enable such ring C' to resist shear when subjected to end-thrust.

In Figure 8 I have shown another modified form of composite ring C'' comprising a solid resilient body 50 of circular cross section wherein either asbestos or carbon particles 51 are embedded at random as reinforcements to enable such ring C'' to resist shear when subjected to end-thrust.

What I claim as my invention is:

1. In combination, a length of tubing having adjacent one end thereof an outer concave annular surface curved outwardly and toward the end of said tubing, said curved surface in section forming substantially an arc of a circle of an extent of slightly less than 90°, an annular fitting encircling said end portion and having an annular channel and an annular recess in axial communication with each other spaced from an end of said fitting, said channel opening radially inwardly, the outer diameter of said recess being substantially less than that of said channel, said recess having an annular concave end surface curved inwardly and toward the end of said fitting, said last-mentioned annular surface in section forming an arc of a circle of an extent of slightly less than 90° and in the assembled position on said tubing being in opposed relation to the first-mentioned annular surface, and a single means providing a fluid-tight seal between said tubing and said fitting and preventing accidental withdrawal of said tubing from said fitting, comprising a resilient radially expansible and substantially axially non-compressible ring of circular cross section between and having surface sealing engagement with the opposed curved surfaces aforesaid, and a closed annular coil spring embedded in said resilient ring adjacent but not protruding from the surface thereof, said channel being adapted to substantially completely receive the expanded ring to provide clearance for manual insertion or withdrawal of said tubing relative to said fitting, the interior of said fitting between the outer end thereof and said recess being spaced from said tube a distance less than the radius of the cross-section of said sealing means.

2. In combination, a length of tubing having adjacent one end thereof an outer concave annular surface curved outwardly and toward the end of said tubing, said curved surface in section forming substantially an arc of a circle of an extent of slightly less than 90°, an annular fitting encircling said end portion and having an annular channel and an annular recess in axial communication with each other spaced from an end of said fitting, said channel opening radially inwardly, the outer diameter of said recess being substantially less than that of said channel, said recess having an annular concave end surface curved inwardly and toward the end of said fitting, said last-mentioned annular surface in section forming an arc of a circle of an extent of slightly less than 90° and in the assembled position on said tubing being in opposed relation to the first-mentioned annular surface, and a single means providing a fluid-tight seal between said tubing and said fitting and preventing accidental withdrawal of said tubing from said fitting, comprising a preformed radially expansible and contractible substantially axially non-compressible composite solid elastic shear resisting ring of circular cross section between and having surface sealing engagement with the opposed curved surfaces aforesaid, said channel being adapted to substantially completely receive the expanded ring to provide clearance for manual insertion or withdrawal of said tubing relative to said fitting, the interior of said fitting between the outer end thereof and said recess being spaced from said tube a distance less than the radius of the cross-section of said sealing means, said sealing means being so constructed and arranged that same is prevented by its composition and characteristics from extruding or cold flowing into the said space between said tube and said fitting.

3. The combination as set forth in claim 2 in which said recess is disposed between said channel and the end aforesaid of said fitting and in which said recess is in registration with and opens radially inwardly toward said concave annular surface.

4. The combination as set forth in claim 2 in which said annular fitting is provided with a second annular channel and a second annular recess, said second recess having an annular concave end surface curved inwardly toward and in the opposite direction axially with respect to the curvature of the first-mentioned recess to receive the end of a second length of tubing insertable in the fitting at the end thereof opposite said first-mentioned tubing, said fitting being provided between said annular channels with an integral inwardly projecting annular portion, and a single annular resilient sleeve having annular flanges overlapping and having sealing engagement with opposite ends of said inwardly projecting annular portion and with the adjacent ends of the tubings.

5. The structure described in claim 4 wherein the annular resilient sleeve is compressible and deformable by said lengths of tubing during manual insertion or withdrawal of said tubing relative to said fitting.

6. The combination as set forth in claim 2 in which metal particles are embedded in the sealing ring to resist shear when subjected to end-thrust.

7. The combination as set forth in claim 2 in which asbestos is embedded in the sealing ring to resist shear when subjected to end-thrust.

8. The combination as set forth in claim 2 in which carbon particles are embedded in the sealing ring to resist shear when subjected to end-thrust.

References Cited in the file of this patent

UNITED STATES PATENTS

| | | |
|---|---|---|
| 989,177 | Montgomery | Apr. 11, 1911 |
| 1,117,856 | Kent | Nov. 17, 1914 |
| 1,984,806 | Pfefferle | Dec. 18, 1934 |
| 2,040,155 | Shoemaker | May 12, 1936 |
| 2,111,956 | Baldwin | Mar. 22, 1938 |
| 2,253,018 | Cowles | Aug. 19, 1941 |
| 2,388,633 | De Woody | Nov. 6, 1945 |
| 2,463,235 | Andrews | Mar. 1, 1949 |
| 2,479,960 | Osborn | Aug. 23, 1949 |
| 2,571,348 | Drinkwater | Oct. 16, 1951 |
| 2,590,565 | Osborn | Mar. 25, 1952 |
| 2,669,465 | Newell | Feb. 16, 1954 |
| 2,702,200 | Fukuyama | Feb. 15, 1955 |
| 2,812,958 | Rodgers | Nov. 12, 1957 |

FOREIGN PATENTS

| | | |
|---|---|---|
| 19,226 | Australia | Sept. 9, 1929 |
| 115,326 | Australia | June 10, 1942 |
| 501,139 | Belgium | Feb. 28, 1951 |
| 899,580 | Germany | Dec. 14, 1953 |
| 1,138,633 | France | Jan. 28, 1957 |